(12) United States Patent
Okajima et al.

(10) Patent No.: US 7,543,881 B2
(45) Date of Patent: Jun. 9, 2009

(54) OPENING TRIM WEATHER STRIP

(75) Inventors: Kurato Okajima, Aichi-ken (JP); Satoshi Toki, Aichi-ken (JP); Masanori Aritake, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 0 days.

(21) Appl. No.: 11/987,081

(22) Filed: Nov. 27, 2007

(65) Prior Publication Data

US 2008/0122251 A1    May 29, 2008

(30) Foreign Application Priority Data

Nov. 28, 2006   (JP)   ............................ P2006-320290

(51) Int. Cl.
 *B60J 10/08* (2006.01)
(52) U.S. Cl. .................................... 296/146.9; 49/490.1
(58) Field of Classification Search .............. 296/146.9; 49/490.1

See application file for complete search history.

(56) References Cited

U.S. PATENT DOCUMENTS

| 5,753,063 | A | 5/1998 | Sakakibara et al. |
| 6,110,546 | A | 8/2000 | Honda et al. |
| 6,896,954 | B2 | 5/2005 | Omori et al. |
| 2002/0027378 | A1 * | 3/2002 | Nozaki ..................... 296/146.9 |

FOREIGN PATENT DOCUMENTS

| JP | 8-174620 | 7/1996 |
| JP | 2001-130264 | 5/2001 |
| JP | 2001-246991 | 9/2001 |

* cited by examiner

*Primary Examiner*—Joseph D Pape
(74) *Attorney, Agent, or Firm*—McGinn IP Law Group, PLLC

(57) ABSTRACT

An opening trim weather strip includes a trim portion, a seal portion, and a cover lip integrally formed to the trim portion and extended to a vehicle interior side thereof. The cover lip is formed with a cover lip main body by a sponge member and formed with a cover lip skin layer formed by a solid member at a surface of the cover lip main body. A modulus of the cover lip skin layer is made to be equal to or smaller than a modulus of the cover lip main body.

5 Claims, 4 Drawing Sheets

PRIOR ART

OPENING TRIM WEATHER STRIP

BACKGROUND OF THE INVENTION

1. Field of the Invention

The present invention relates to an opening trim weather strip attached to a vehicle body opening peripheral part of a vehicle body of an automobile for sealing a gap between the vehicle body opening peripheral part and an automobile door, particularly relates to an opening trim weather strip which is provided with a cover lip and in which at least a main body of the cover lip is formed by a sponge member.

2. Related Art

An opening trim weather strip 110 attached to a vehicle body opening peripheral part of a vehicle body of an automobile is molded by extrusion and is constituted by a trim portion 120, a cover lip 130 and a hollow seal portion 140 as shown by FIG. 5.

The trim portion 120 holds the opening trim weather strip 110 over an entire periphery of a vehicle body opening by clamping a flange portion formed at a vehicle body opening peripheral part 6. The trim portion 120 is formed by a solid member or a slightly foamed member, inside thereof is embedded with an insert member 126, an inner face thereof is formed with a vehicle exterior side hold lip 124 and a vehicle interior side hold lip 125 for holding the flange portion to thereby hold the flange portion of the vehicle body.

The hollow seal portion 140 is formed integrally with a vehicle exterior side of the trim portion 120 for sealing a gap between a door 2 and the vehicle body opening peripheral part 6 by being brought into contact with an outer periphery of the door 2 when the door 2 is closed. The hollow seal portion 140 is formed with a sponge member to be flexibly brought into contact with the door 2 in accordance with a shape thereof to firmly seal.

The cover lip 130 is extended in a vehicle interior direction from a portion on a vehicle interior side of the trim portion 120, brought into contact with a garnish or the like provided at inside of a vehicle to thereby cover a gap between the opening trim weather strip 110 and the garnish or the vehicle body. The cover lip 130 is formed by a solid member, or a slightly foamed member similar to the trim portion 120, further, a surface of the cover lip 130 is provided with a skin layer 133 made of a thermoplastic elastomer of a solid member for garnishment (refer to, for example, JP-A-8-174620, JP-A-2001-130264 and JP-A-2001-246991).

In recent years, light-weight formation of an automobile has been requested for protecting a global environment and it is also requested to light-weight the opening trim weather strip 110 for the light-weight formation of an automobile. A specific weight of the solid member for forming the trim portion 120 and the cover lip 130 is about 1.2, a specific weight of the slightly foamed member is about 0.95 through 1.05, and therefore, it is requested to constitute the specific weight by about 0.5 through 0.8 by the sponge member by further foaming.

However, the opening trim weather strip 110 is attached to an entire periphery of the vehicle body opening peripheral part 6 of an automobile to be along therewith, and therefore, the opening trim weather strip 110 is bent to be attached thereto at a corner portion. At that occasion, in a case of forming the main body of the cover lip 130 by the sponge member for the light-weight formation as described above, when the skin layer 133 is formed by the solid member in correspondence with the trim portion of the solid member, the slightly foamed member of the background art, there is a concern that the skin layer 133 cannot follow elongation of the main body of the cover lip 130, wrinkles are produced at the surface of the bent cover lip 130 and an appearance thereof is deteriorated.

Therefore, it is desired to provide an opening trim weather strip in which wrinkles are not produced at a surface of a cover lip even when a light-weight opening trim weather strip is attached by being bent at a corner portion and which is excellent in appearance and can easily and inexpensively be fabricated.

In order to resolve the above-described problem, the first aspect of the invention is an opening trim weather strip attached to a periphery of a vehicle body opening of a vehicle body for sealing a gap between a vehicle body opening peripheral part and an automobile door, comprising:

a trim portion attached to the vehicle body opening peripheral part;

a seal portion integrally formed with a vehicle exterior side of the trim portion for being brought into contact with the automobile door to seal the gap; and a cover lip integrally formed with the trim portion and extended to a vehicle interior side thereof;

wherein the cover lip is formed with a cover lip main body by a sponge member, and a cover lip skin layer formed by a solid member at a surface of the cover lip main body, and a modulus of the cover lip skin layer is made to be equal to or smaller than a modulus of the cover lip main body.

According to the first aspect of the invention, the opening trim weather strip includes the trim portion attached to the vehicle body opening peripheral part for holding the opening trim weather strip, the seal portion integrally formed with the vehicle exterior side of the trim portion and brought into contact with the automobile door to seal, and the cover lip integrally formed with the trim portion and extended to a vehicle interior side thereof. Therefore, when the trim portion is attached to the vehicle body opening peripheral part, the seal portion can firmly be brought into contact with the door to seal the gap between the vehicle body opening peripheral part and the door. Further, the cover lip can cover a gap between the opening trim weather strip and an interior member, a garnish or the like of a vehicle body and can promote the appearance.

The cover lip is formed with the cover lip main body by the sponge member, and therefore, a weight of the portion of the cover lip can be reduced, which can contribute to light-weight formation of the automobile.

The surface of the cover lip main body is formed with the cover lip skin layer formed by the solid member, and therefore, even when the cover lip main body is formed by the sponge member, a predetermined surface can be constituted and the appearance can be promoted.

A color and a material of the cover lip skin layer can be selected separately from the cover lip main body, it is easy to change the color or the like of the cover lip skin layer in accordance with an environment of using the opening trim weather strip, which is preferable in view of design. The cover lip skin layer is provided integrally with the cover lip main body and can continuously be formed in series of steps after extruding the cover lip main body, and therefore, fabrication thereof is facilitated.

The modulus of the cover lip skin layer is made to be equal to or smaller than the modulus of the cover lip main body, and therefore, even when the opening trim weather strip is attached by being bent at a corner portion of the vehicle body opening peripheral part, the cover lip skin layer is formed in correspondence with a deformation of the cover lip main body, and wrinkles are not brought about at a surface of the cover lip.

The second aspect of the invention is the opening trim weather strip, wherein the cover lip main body is formed by a sponge rubber and the cover lip skin layer is formed by a thermoplastic elastomer.

According to the second aspect of the invention, the cover lip main body is formed by the sponge rubber and the cover lip skin layer is formed by the thermoplastic elastomer, and therefore, after vulcanizing and foaming the opening trim weather strip including the cover lip main body, the thermoplastic elastomer can fixedly be attached thereto and fabrication thereof is facilitated. Owing to the sponge rubber, the cover lip main body is rich in a flexibility and can follow recesses and projections or bending of the vehicle body opening peripheral part and the cover lip is excellent in appearance.

Further, by changing a composition of the thermoplastic elastomer, the modulus or a rigidity can be changed and it is easy for the thermoplastic elastomer to be in conformity with the modulus or the rigidity of the cover lip main body.

The third aspect of the invention is the opening trim weather strip, wherein the thermoplastic elastomer forming the cover lip skin layer is provided with a rate of a rubber component and a resin component by 88:12 through 80:20.

According to third aspect of the invention, the rate of the rubber component and the resin component of the thermoplastic elastomer of the cover lip skin layer is 88:12 through 80:20, and therefore, the rubber component is larger than that of a normal thermoplastic elastomer, the modulus or the rigidity can be made to be low, and even when the opening trim weather strip is bent to be attached to the corner portion of the vehicle body opening peripheral part, the opening trim weather strip follows an elongation of the cover lip main body and wrinkles are not brought about at the surface of the cover lip.

The fourth aspect of the invention is the opening trim weather strip, wherein the trim portion and the seal portion are formed by a sponge member.

According to the fourth aspect of the invention, the trim portion and the seal portion are formed by the sponge member, and therefore, the light-weight formation of the opening trim weather strip can further be achieved, the flexibility is increased, and attachment thereof is facilitated even at a corner portion.

The fifth aspect of the invention is the opening trim weather strip, wherein the trim portion is formed by a solid member, and the seal portion is formed by a sponge member.

According to the fifth aspect of the invention, the trim portion is formed by the solid member, when the trim portion is attached to the vehicle body opening peripheral part, the trim portion can solidly clamp the vehicle body opening peripheral part, and the opening trim weather strip is not detached from the vehicle body opening peripheral part. The seal portion is formed by the sponge member, and therefore, the flexibility is high, and when the door is closed, the seal portion is brought into contact with the door in accordance with a shape of an outer periphery thereof and the seal performance can be ensured.

The sixth aspect of the invention is the opening trim weather strip, wherein the seal portion is constituted by a hollow shape.

According to the sixth aspect of the invention, the seal portion is constituted by the hollow shape, and therefore, even when the seal portion is brought into contact with the door in closing the door, the seal portion is easy to be deformed and can firmly be brought into contact with recesses or projections or a curved face of the door, and even in closing the door, in comparison with a lip shape, the seal portion is not abnormally deformed, and even when there is a dispersion in a dimension of the vehicle body or the door, the seal portion can firmly seal the vehicle body or the door.

The seventh aspect of the invention is the opening trim weather strip, wherein the sponge member is a sponge rubber of EPDM having a 100% modulus of 0.7 MPa through 2.5 MPa, and the solid member is an olefin species thermoplastic elastomer having a 100% modulus of 0.7 MPa through 2.5 MPa.

According to the seventh aspect of the invention, the sponge member is the sponge rubber of EPDM having the 100% modulus of 0.7 MPa through 2.5 MPa, and the solid member is the olefin species thermoplastic elastomer having the 100% modulus of 0.7 MPa through 2.5 MPa. Therefore, the sponge member is sufficiently soft and the flexibility of the solid member can be set to be equal to or smaller than the flexibility of the sponge member in accordance therewith. Therefore, the solid member can be bent in accordance with bending the sponge member and wrinkles are not brought about at the surface of the cover lip.

Further, after vulcanizing EPDM of the cover lip main body, the olefin species thermoplastic elastomer of the cover lip skin layer can solidly and easily be welded and fabrication thereof is facilitated.

The cover lip is formed with the cover lip main body by the sponge member and formed with the cover lip skin layer formed by the solid member at the surface, and therefore, the weight of the portion of the cover lip can be reduced, and the appearance can be promoted. The color or the material of the cover lip skin layer can be selected separately from those of the cover lip main body, it is easy to change the color or the like of the cover lip skin layer, which is preferable in view of design.

Further, the modulus of the cover lip skin layer is made to be equal to or smaller than the modulus of the cover lip main body, and therefore, even when the opening trim weather strip is bent to be attached to the corner portion of the vehicle body opening peripheral part, the cover lip skin layer is deformed in correspondence with the deformation of the cover lip main body and wrinkles are not brought about at the surface of the cover lip.

DETAILED DESCRIPTION OF THE PREFERRED EMBODIMENTS

Embodiments of the invention will be explained in reference to FIG. 1 through FIG. 4.

Figure 1:
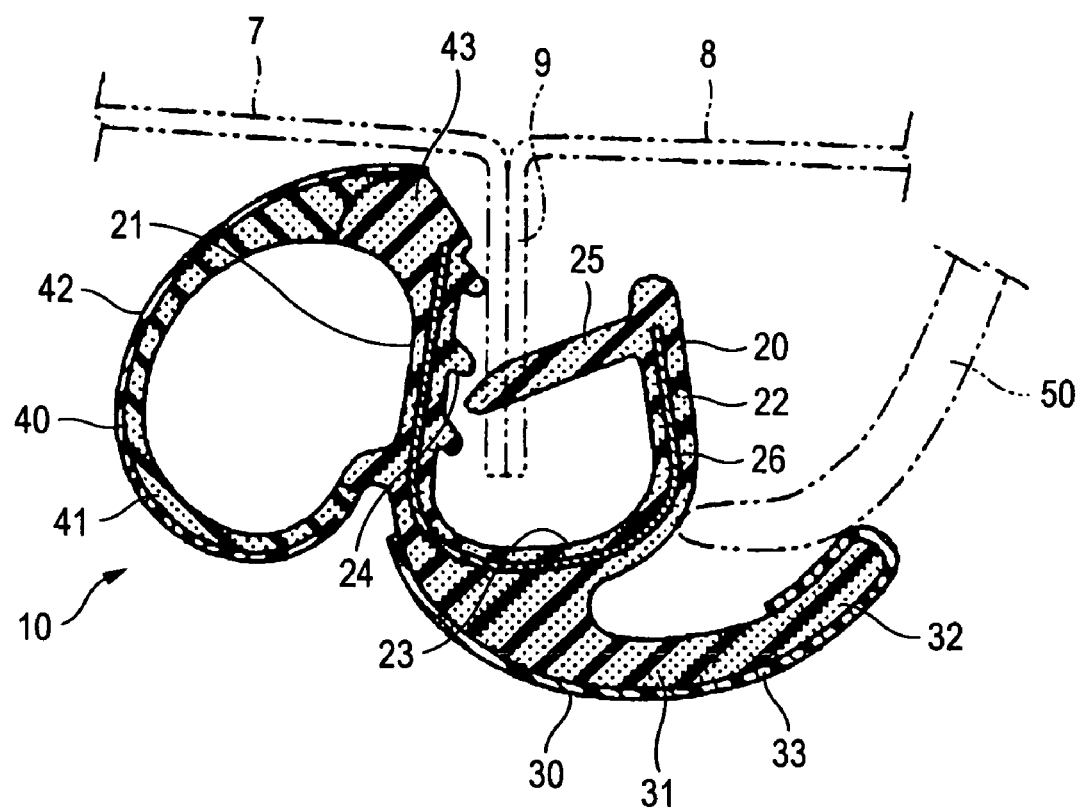
FIG. 1 shows a sectional shape of an opening trim weather strip according to a first embodiment of the invention.
Figure 2:
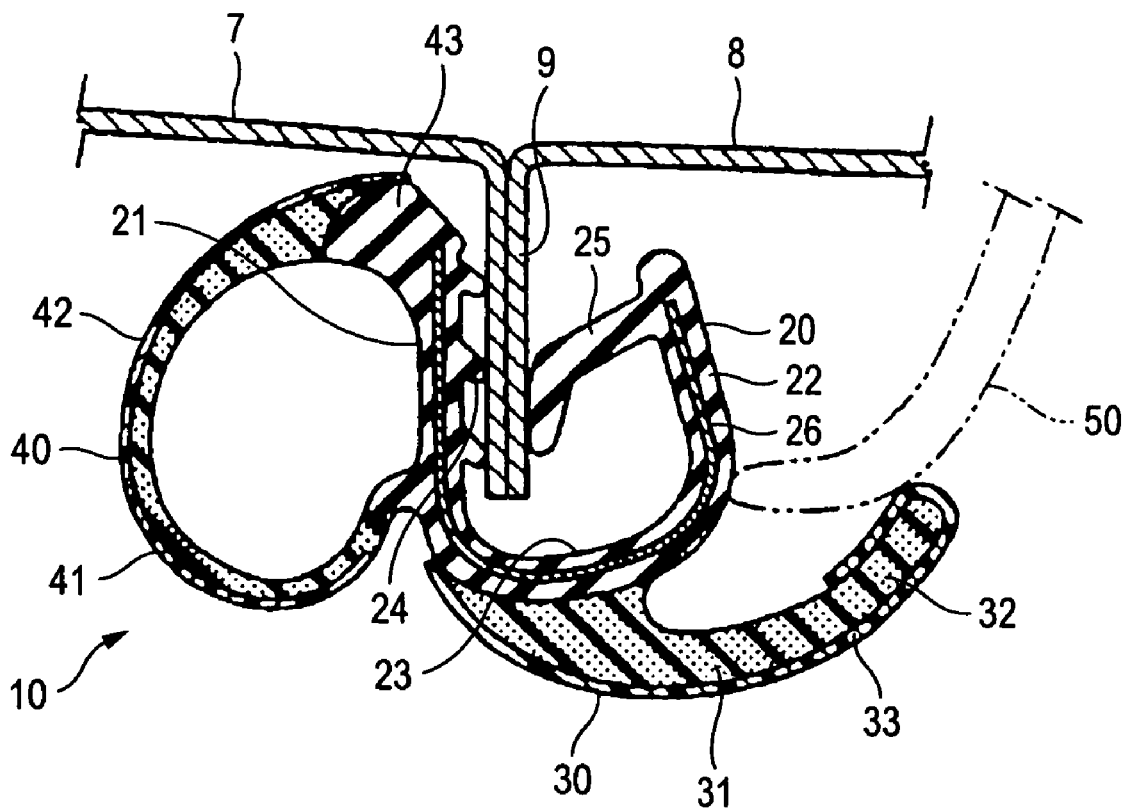
FIG. 2 shows a sectional shape of an opening trim weather strip according to a second embodiment of the invention.
Figure 3:
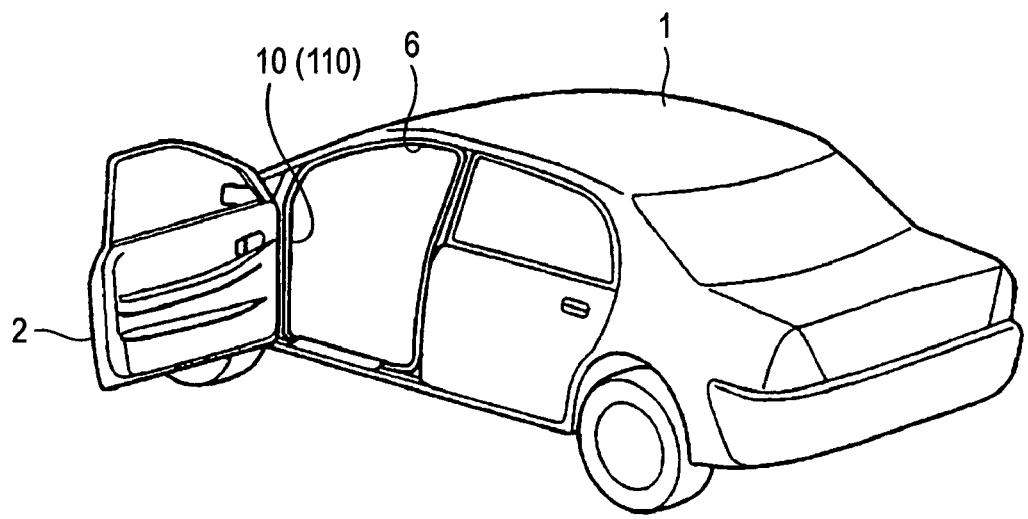
FIG. 3 is a perspective view viewing an automobile from a rear side in a state of opening a door.
Figure 4:
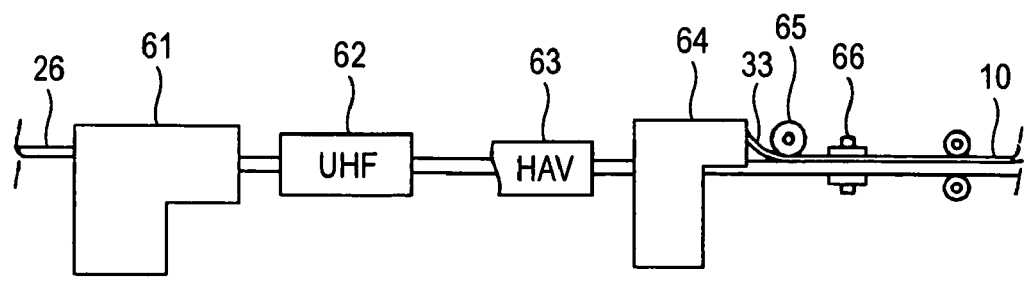
FIG. 4 is a schematic diagram of steps of fabricating an opening trim weather strip according to the embodiments of the invention.
Figure 5:
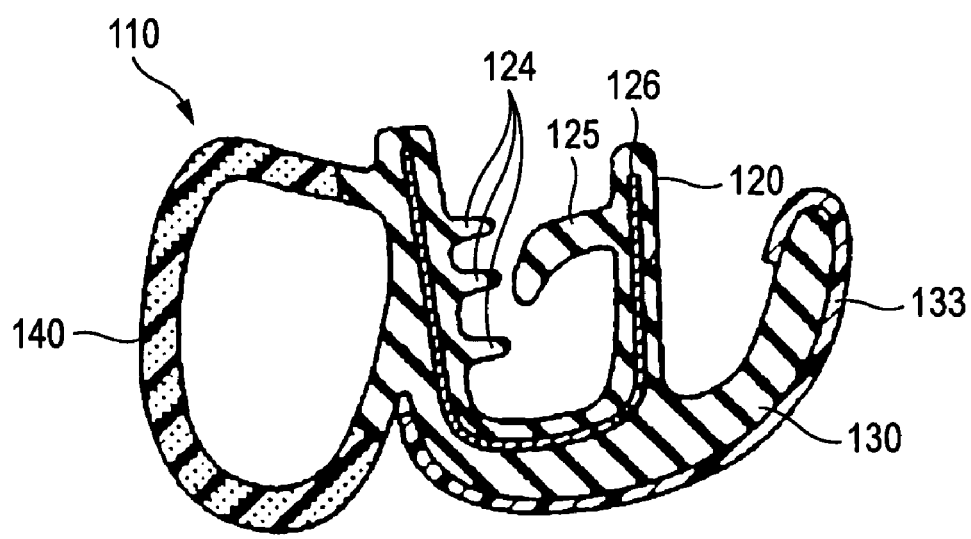
FIG. 5 shows a sectional shape of an opening trim weather strip of a background art.

FIG. 1 is a sectional view of an opening trim weather strip 10 according to a first embodiment of the invention, and FIG. 2 is a sectional view of a state of attaching the opening trim weather strip 10 according to a second embodiment of the invention to the vehicle body opening peripheral part 6 of the vehicle body. FIG. 3 is a perspective view viewing an automobile in a state of opening the door 2 from a rear side. FIG. 4 is a conceptual diagram showing steps of fabricating the opening trim weather strip 10 of the invention by extrusion.

As shown by FIG. 3, the opening trim weather strip 10 of the invention is attached to a flange portion 9 formed at the vehicle body opening peripheral part 6 of the opening portion of the vehicle body opened and closed by the door 2 in a ring-like shape over an entire periphery thereof.

FIG. 1 is a sectional view of the opening trim weather strip 10 according to the first embodiment of the invention. The opening trim weather strip 10 comprises a trim portion 20 and a cover lip 30 and a hollow seal portion 40. An upper face of the cover lip 30 is provided with a cover lip skin layer 33.

The trim portion 20 is constituted substantially by a U-shape in a section thereof formed by a vehicle exterior side wall 21, a vehicle interior side wall 22, and a bottom wall 23 and inside thereof is embedded with an insert member 26. The cover lip 30 extended from an outer face of the bottom wall 23 to an inner side of a vehicle compartment is provided. As shown by FIG. 1, an inner face of the trim portion 20 having a section substantially in the U-shape is provided with a plurality of vehicle exterior side hold lips 24 and one vehicle interior side hold lip 25.

The flange portion 9 of the vehicle body opening peripheral part 6 is inserted to inside of the U-shape of the trim portion 20, and held by the vehicle exterior side hold lips 24 and the vehicle interior side hold lip 25 to thereby mount the opening trim weather strip 10 to the flange portion 9.

The vehicle interior side hold lip 25 is one piece of a long lip, and therefore, the vehicle interior side hold lip 25 can be deformed in complying with a thickness of the flange portion 9, a force of inserting the flange portion 9 can be reduced and the flange portion 9 can be prevented from being drawn therefrom.

The trim portion 20 is formed by a sponge member of rubber, a thermoplastic elastomer or the like. As rubber, for example, EPDM rubber as synthetic rubber can be used.

Since the insert member 26 is embedded to inside of the trim portion 20, even when the trim portion 20 is formed by the sponge member, a force of holding the flange portion 9 can sufficiently be ensured. Further, since the trim portion 20 is formed by the sponge member, a weight thereof can be reduced, which can contribute to light-weighted formation of the opening trim weather strip 10.

As described above, the cover lip 30 is extended integrally in the vehicle interior direction by a shape of a circular arc from the outer face, a lower face in FIG. 1 of the bottom wall 23 of the trim portion 20. A cover lip front end portion 32 constituting a front end portion of the cover lip 30 is brought into contact with a garnish 50 attached to the vehicle interior side to cover a gap between the garnish 50 and the opening trim weather strip 10 to promote an appearance thereof. When there is not the garnish 50, the cover lip front end portion 32 is brought into contact with an interior member or the like on the vehicle interior side.

The cover lip 30 is formed by a cover lip main body 31 and the cover lip skin layer 33 covering the cover lip main body 31. The cover lip main body 31 is integrally formed by a material the same as that of a sponge member for forming the trim portion 20. Therefore, a weight of the cover lip 30 can be reduced, which can contribute to light-weight formation of the opening trim weather strip 10 and the cover lip 30 can be brought into contact with the garnish 50 easily without a gap therebetween in accordance with a shape of the garnish 50 by increasing a flexibility of the cover lip 30.

The upper face of the cover lip 30 is fixedly attached with the cover lip skin layer 33. The upper face of the cover lip 30 can be viewed from the inner side of the vehicle compartment. Therefore, it is necessary to change a surface pattern of the cover lip skin layer 33 in correspondence with a color and a luster of an interior of an automobile in view of design and the cover lip skin layer 33 having a surface pattern in harmony with an interior is used.

The cover lip skin layer 33 completely covers the cover lip front end portion 32 of the cover lip main body 31 to reach an inner face side of the cover lip main body 31.

The cover lip skin layer 33 is formed by a solid member of a thermoplastic elastomer. According thereto, there is used a solid member for ensuring transcription of a crimp pattern in order to improve the appearance when recesses and projections of air bubbles or the like are not brought about at a surface thereof or in harmony with a crimp pattern of the surface of the garnish or the like. Since the thermoplastic elastomer is used, even when other portion of the opening trim weather strip 10 is formed by rubber, after vulcanizing and foaming rubber, the cover lip skin layer 33 of the thermoplastic elastomer can be brought into press contact therewith.

As the thermoplastic elastomer, when the cover lip main body 31 is formed by EPDM rubber, it is preferable to use an olefin species thermoplastic elastomer since the cover lip skin layer 33 is easily melted with the cover lip main body 31 and the cover lip main body 31 and the cover lip skin layer 33 are strongly welded.

It is necessary that a modulus of the solid member of the cover lip skin layer 33 is the same as or smaller than that of the cover lip main body 31. According thereto, the opening trim weather strip 10 is attached to the vehicle body opening peripheral part 6 of the automobile over the entire periphery along therewith and attached by being bent at a corner portion thereof. However, because when the modulus of the cover lip skin layer 33 is made to be the same as or smaller than that of the cover lip main body 31, even when the opening trim weather strip 10 is bent to be attached to the corner portion of the vehicle body opening peripheral part 6, the cover lip skin layer 33 is deformed in correspondence with deformation of the cover lip main body 31, wrinkles are not brought about at the surface of the cover lip 30 and a predetermined surface can be provided.

Here, when a rubber elastic member applied with a constant strain (elongation), the modulus refers to a stress of resisting the strain such that the physical body maintains an original shape. A unit thereof is designated by MPa. According to the invention, a stress when 100% of a strain (elongation) is applied to a rubber elastic member is referred to as 100% modulus. According to the embodiment, it is preferable that the 100% modulus of the cover lip skin layer 33 falls in a range of 0.7 MPa through 1.5 MPa. When smaller than 0.7 MPa, the rubber elastic member is excessively soft and seal performance of the cover lip 30 cannot be ensured. When equal to or larger than 1.5 MPa, there is a concern of producing wrinkles on the surface of the cover lip 30.

According to the thermoplastic elastomer used in the cover lip skin layer 33, when the cover lip main body 31 comprises sponge rubber of EPDM, it is preferable to use the olefin species thermoplastic elastomer therefor.

In order to make the 100% modulus of the olefin species thermoplastic elastomer fall in the above-described range, it is preferable that to constitute a rate of a rubber component and a resin component by 88:12 through 80:20. An olefin species thermoplastic elastomer whose major component is EPDM rubber as a rubber component and polypropylene resin as a resin component is preferable.

Although normally, the rate of the rubber component and the resin component of the olefin species thermoplastic elastomer is about 70:30, according to the olefin species thermoplastic elastomer used in the invention, the rate of the rubber component is made to be high and the modulus is made to be low. Further, a mineral oil species softener can be included in the thermoplastic elastomer. In this case, the modulus can further be made to be low.

As the mineral oil species softener, a mineral oil of aromatic species, naphthene species, or paraffin species normally blended in rubber is pointed out. Among them, the paraffin species mineral oil is preferable.

The hollow seal portion 40 is formed in the vehicle exterior direction integrally with the outer face of the vehicle exterior side wall 21 of the trim portion 20. The hollow seal portion 40 is constituted by a hollow seal portion inner wall and a hollow seal portion skin layer 42.

The hollow seal portion inner wall 41 is integrally formed by a material the same as that of the sponge member forming the trim portion 20. Therefore, a weight of the hollow seal portion 40 can be reduced, which can contribute to light-weighted formation of the opening trim weather strip 10. Further, when the door is closed, the hollow seal portion 40 can firmly be brought into contact to seal the door 2 by increasing a flexibility of the hollow seal portion 40 and the force of closing the door 2 can be reduced.

Further, although according to the embodiment, the hollow seal portion 40 is used, a seal portion in a lip-like shape can also be used.

It is preferable to constitute the hollow seal portion skin layer 42 by an EPDM solid rubber member. This is because the hollow seal portion 40 includes a bent portion having a small radius of curvature and it is difficult to paste together therewith at a later step and when there is not the bent portion having the small radius of curvature, similar to the cover lip skin layer 33, the hollow seal portion skin layer 42 can also be constituted by the solid member of the thermoplastic elastomer.

As the thermoplastic elastomer, when the hollow seal portion inner wall 41 is formed by EPDM sponge rubber, it is preferable to use the olefin species thermoplastic elastomer to thereby strongly weld the hollow seal portion inner wall 41 and the hollow seal portion skin layer 42.

Next, the second embodiment will be explained in reference to FIG. 2. The second embodiment differs from the first embodiment in that the trim portion 20 is formed by the solid member, other portion stays the same, and therefore, a different portion will be explained and an explanation of the same portion will be omitted.

All of the vehicle exterior side wall 21, the vehicle interior side wall 22, the bottom wall 23, the vehicle exterior side hold lip 24 and the vehicle interior side hold lip 25 of the trim portion 20 are formed by the solid member, and therefore, when the trim portion 20 is attached to the flange portion 9 of the vehicle body opening peripheral part 6, the vehicle exterior side hold lip 24 and the vehicle interior side hold lip 25 can solidly clamp the flange portion 9. Therefore, the opening trim weather strip 10 is not detached from the flange portion 9 of the vehicle body opening peripheral part 6, the hollow seal portion 40 is stabilized and can firmly be brought into contact with the predetermined position of the door 2 to seal.

Further, when the hollow seal portion inner wall 41 of the hollow seal portion 40 is constituted by the solid member integrally with the trim portion 20 up to a hollow seal portion root portion 43 constituting a portion continuous to the vehicle exterior side wall 21, the root portion of the hollow seal portion 40 is stabilized, the hollow shape is not deformed, when the door is closed, the hollow seal portion 40 can be firmly brought into contact with the door 2 to ensure the seal performance.

Further, the hollow seal portion skin layer 42 can use solid rubber of a material the same as that of the trim portion 20 similar to the above-described first embodiment.

Next, a method of fabricating the opening trim weather strip 10 will be explained. FIG. 4 is a schematic diagram showing a portion of a fabrication line of the opening trim weather strip 10.

According to the opening trim weather strip 10, first, the trim portion 20, the hollow seal portion 40 and the cover lip main body 31 are molded by an extruder 61. The insert member 26 is supplied to the extruder 61 and when the trim portion 20, the hollow seal portion 40 and the cover lip main body 31 are sponge members, the insert member 26 and the sponge members are extruded.

Further, when the trim portion 20 and the hollow seal portion skin layer 42 are solid members, and the hollow seal portion inner wall 41 and the cover lip main body 31 are constituted by sponge, the solid member constituting the trim portion 20 and the hollow seal portion skin layer 42 and the sponge member constituting the hollow seal portion inner wall 41 and the cover lip main body 31 are simultaneously extruded to thereby extrude the trim portion 20, the hollow seal portion 40 and the cover lip main body 31. Thereafter, when the materials are constituted by rubber, the materials are transferred to a high frequency heating furnace 62, a hot wind heating furnace 63 or the like to be heated and vulcanized.

The trim portion 20, the hollow seal portion 40 and the cover lip main body 31 are transferred to an extrusion mold attached with a nozzle of an extruder 64 for extruding the cover lip skin layer 33. Here, the color lip skin layer 33 having a color in correspondence with an interior of an inner side of a vehicle is extruded in a sheet-like shape to an upper face of the cover lip 30 of the opening trim weather strip 10.

Further, the cover lip skin layer 33 and the hollow seal portion skin layer 42 may simultaneously and integrally be extruded to form.

As shown by FIG. 4, the trim portion 20, the hollow seal portion 40 and the cover lip main body 31 in which the cover lip skin layer 33 is extruded to the upper face of the cover lip main body 31 are transferred to a press roller 65 and the cover lip skin layer 33 is pressed to the cover lip main body 31 by the press roller 65. Further, at this occasion, a pattern may be formed on the surface of the cover lip skin layer 33.

Further, by a bending roller 66, an end portion of a side portion of the cover lip skin layer 33 turns around to a back face of the cover lip front end portion 32 to thereby press the cover lip main body 31 and the cover lip skin layer 33.

At this occasion, the cover lip main body 31 is brought into a warm state since the cover lip main body 31 is after having been vulcanized, further, the cover lip skin layer 33 is at a high temperature since the cover lip skin layer 33 is immediately after having been extruded and the cover lip skin layer 33 is solidly welded to the weather strip main body 51. Further, in order to intensify a welding force, a primer or the like may also be coated to the surface of the cover lip main body 31.

Further, the cover lip skin layer 33 and the weather strip main body 51 can further solidly be adhered when the both members are constituted by the same olefin species material such that the cover lip main body 31 is formed by EPDM and the cover lip skin layer 33 is formed by the olefin species thermoplastic elastomer.

The opening trim weather strip 10 fixedly attached with the cover lip skin layer 33 is transferred to a cooling tank (not illustrated) and is cooled by water or cold wind.

The opening trim weather strip 10 coming out from the cooling tank (not illustrated) is pulled by a pulling machine (not illustrated), the trim portion 20 is bent in a U-shape, cut to a predetermined dimension, thereafter, a distal end portion thereof is adhered when needed to constitute a product. Further, depending on the opening trim weather strip 10, a product may be constituted by attaching a double face adhering tape, a clip or the like thereto.

Although according to the first and the second embodiments, there is shown a constitution embedded with a core at the trim portion, formed with the section substantially in the U-shape and including the flange holding lip, there may be constructed a constitution of the trim portion having a section substantially in an L-shape, not embedded with a core and not including a flange holding lip. In this case, the constitution is attached to the flange portion by a double face adhering tape, a clip or the like. In the case of the trim portion having the section substantially in the U-like shape, light-weight formation is further achieved.

What is claimed is:

1. An opening trim weather strip attached to a periphery of a vehicle body opening of a vehicle body for sealing a gap between the vehicle body opening peripheral part and an automobile door, comprising:
    a trim portion attached to the vehicle body opening peripheral part, the trim portion comprising a sponge member having a specific weight by 0.5 through 0.8;
    a seal portion integrally formed with a vehicle exterior side of the trim portion for being brought into contact with the automobile door to seal the gap, the seal portion comprising a specific weight of 0.5 through 0.8; and
    a cover lip integrally formed with the trim portion and extended to a vehicle interior side thereof;
    wherein the cover lip comprises:
        a cover lip main body comprising a sponge member having a specific weight of 0.5 through 0.8; and
        a cover lip skin layer comprising a solid member at a surface of the cover lip main body, and
    wherein the sponge member comprises a sponge rubber of EPDM having a 100% modulus of 0.7 MPa through 1.5 Mpa, and the solid member comprises an olefin species thermoplastic elastomer having a 100% modulus of 0.7 MPa through 1.5 MPa.

2. The opening trim weather strip according to claim 1, wherein the thermoplastic elastomer forming the cover lip skin layer is provided with a rate of a rubber component and a resin component by 88:12 through 80:20.

3. The opening trim weather strip according to claim 1, Wherein the seal portion comprises a hollow shape.

4. The opening trim weather strip according to claim 1, wherein the thermoplastic elastomer comprises a mineral oil species softener.

5. The opening trim weather strip according to claim 1, wherein the trim portion comprises a same material as that of the sponge member included in the cover lip main body.

* * * * *